A. JOHNSON.
METHOD AND APPARATUS FOR CUTTING AND APPLYING GASKET LINERS TO CAN ENDS.
APPLICATION FILED OCT. 29, 1917.

1,405,592.

Patented Feb. 7, 1922.
3 SHEETS—SHEET 2.

UNITED STATES PATENT OFFICE.

AXEL JOHNSON, OF OAKLAND, CALIFORNIA, ASSIGNOR TO AMERICAN CAN COMPANY, OF SAN FRANCISCO, CALIFORNIA, A CORPORATION OF NEW JERSEY.

METHOD AND APPARATUS FOR CUTTING AND APPLYING GASKET LINERS TO CAN ENDS.

1,405,592.   Specification of Letters Patent.   Patented Feb. 7, 1922.

Application filed October 29, 1917. Serial No. 199,109.

*To all whom it may concern:*

Be it known that I, AXEL JOHNSON, a citizen of the United States, residing at Oakland, in the county of Alameda and State of California, have invented certain new and useful Improvements in Methods and Apparatus for Cutting and Applying Gasket Liners to Can Ends, of which the following is a specification.

The hereinafter described invention relates to a method and apparatus for cutting ring liners from flat gasket liner material in the form of a fibrous web, placing the liner in axial alignment with a can end and applying the same to the flange thereof and in its preferred embodiment, the apparatus comprises mechanism preferably having a curvilinear path of movement for continuously feeding or advancing a fibrous web of liner material over cutting instrumentalities, which instrumentalities, during the movement of the said mechanism partially cuts or severs a ring liner and an inner core blank from said web, and advances the web with its partially severed members beneath assembling devices, which said devices are continuously moved in timed relation with continuously moving can ends, which ends are brought into substantial axial alignment with the assembling devices, and at which time the partially severed gasket liner and core blank are removed or completely severed from the web by the assembling devices and the ring liner applied to the flange of the can end. The severed core blank being carried by the assembling devices or instrumentalities from within the sphere of the can ends, the various interconnecting or associated instrumentalities being automatic in their operation and operated in synchronism and timed relation relative to the partial cutting of the liner gaskets and applying the same to the flange of a moving can end.

The essential objects of the invention are to provide a simple, efficient and rapidly operating method for applying ring liners to can ends and also an apparatus wherein the can ends may be advanced to assembling position by means of a continuously moving carrier and the liner gasket applied to the flange thereof during their continuous movement; and to provide means whereby the gasket liner may be partially severed from a web of liner material and in the partially severed condition advanced by the movement of the web to an assembling station, at which station the partially severed liner gasket is completely severed and by the severing means applied directly to the flange of a positioned can end.

To comprehend the invention reference should be had to the accompanying sheets of drawings, wherein.

Figures 2, 5:
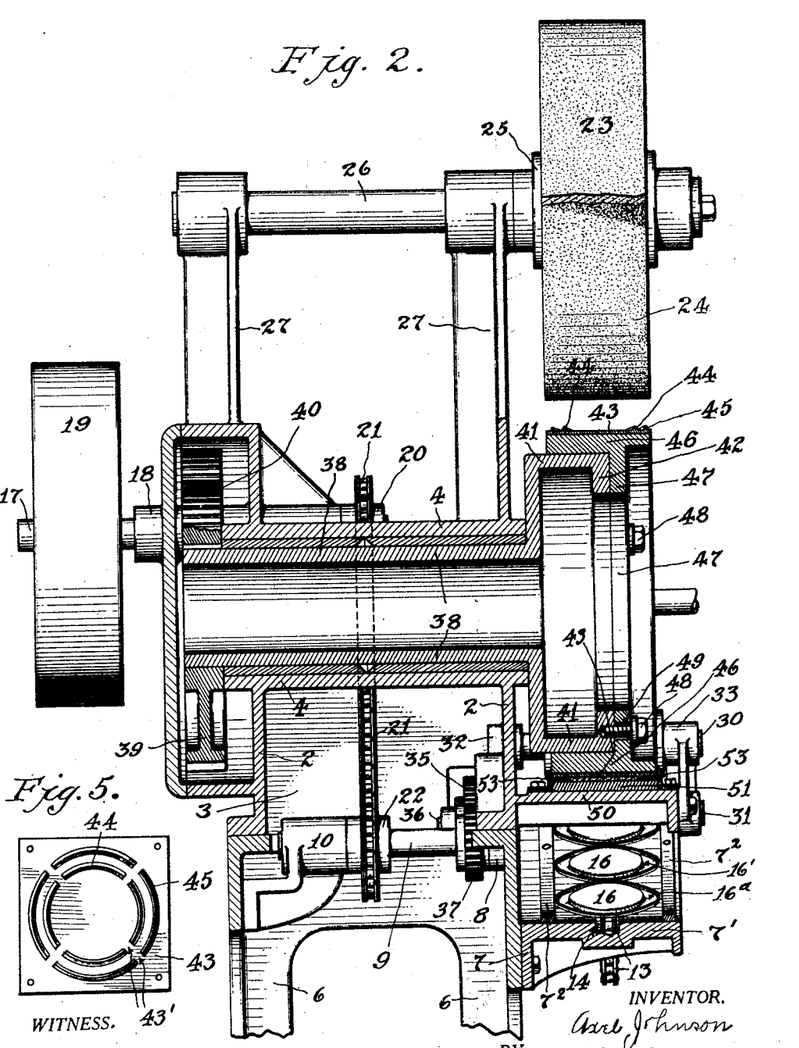
Fig. 2 is a transverse sectional elevation taken on the line 2—2, Fig. 1 of the drawings, and viewed in the direction of the arrows, said view illustrating more clearly the arrangement of the cutting instrumentalities relative to the cutting bed, over which they work in the partial severing of a web liner and inner core blank from the web of liner material, said view illustrating the various drive means for imparting movement to the cutting instrumentalities.
Fig. 5 is an enlarged plan view of one of the cutting instrumentalities removed from its carrier.
Figures 3, 4, 6:
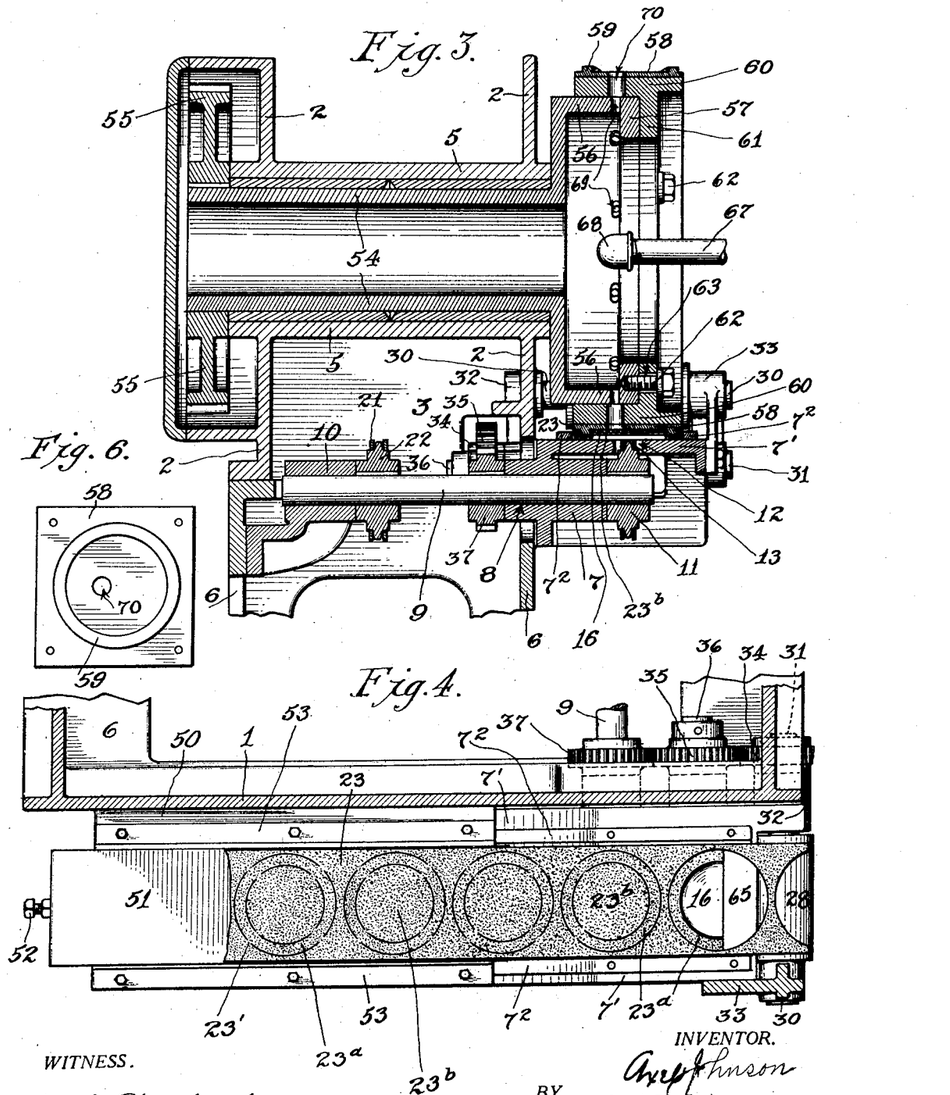
Fig. 3 is a similar view partly broken away taken on the line 3—3 of Fig. 1 of the drawings and viewed in the direction of the arrow, said view illustrating more clearly the assembling means for the final severance of the ring liner and core blank from the web of material and for applying the gasket liner to the flange of the can end, and also illustrating the means for removing the core blank from the assembling devices after the application of the gasket liner to the flange of the can end.
Fig. 4 is a longitudinal section partly broken plan view taken on the line 4—4 Fig. 1 of the drawings, disclosing the web of liner material with gasket liners and core blanks partially severed therefrom, and also illustrating the complete severance of certain of the partially severed gasket liners and core blanks removed therefrom.
Fig. 6 is a similar view of one of the assembling devices removed from its carrier.

In the drawings, the numeral 1, is used to indicate any suitable form of frame capable of sustaining and supporting the working parts of the apparatus, the said frame being illustrated as comprising side pieces 2, which are held in suitable spaced vertical relation by means of the end members 3, and, in the present case, the said side pieces 2, supporting or sustaining the transversely disposed tubular bearings 4 and 5, Figs. 2 and 3 of the drawings. To the depending frame columns 6, is bolted or otherwise secured a laterally extended shelf or support 7, which shelf or support is provided with a downwardly inclined continuation or longitudinal extension 7', and in the said shelf is journalled at 8, a horizontally disposed feed shaft 9, which shaft at its opposite end is journaled in a bearing bracket 10.

Figure 1:
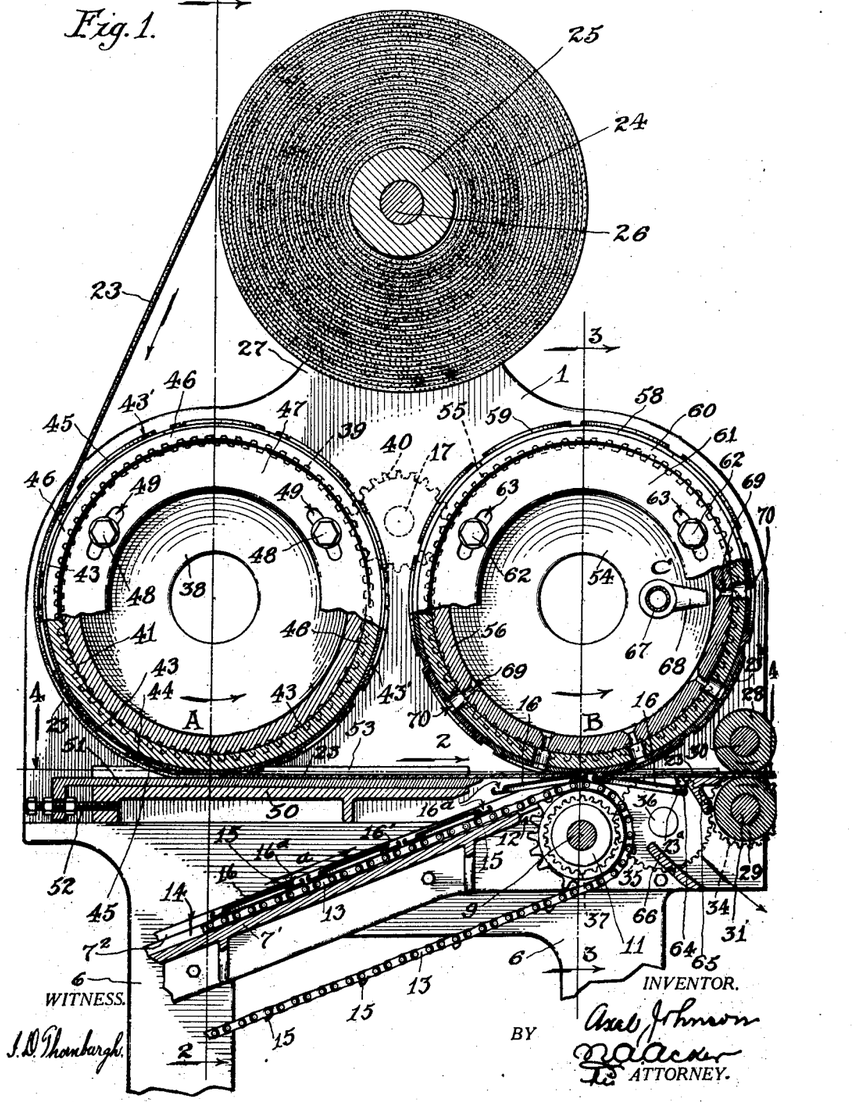
Fig. 1 is a side elevation of the complete apparatus with parts thereof broken away and certain parts being shown in section, to more clearly illustrate the working elements of the apparatus, there being illustrated a web of gasket liner material positioned beneath the cutting and assembling instrumentalities, also disclosing flanged can ends being fed to assembling position to receive a gasket liner as severed from the traveling web of liner material.

To the outer or projecting end of the shaft 9 is secured in any suitable manner a sprocket 11, which works within an opening 12, of the shelf or bracket 7, Figs. 1 and 3 of the drawings. Over the sprocket 11 works an endless carrier 13, which said carrier runs within a groove or channel 14, formed in the upper surface of the downwardly inclined portion or extension 7' of the shelf or bracket 7, and the said endless carrier passes at its lower end over a suitable idler sprocket, not shown. The endless carrier 13 is provided with a series of projecting spaced flights or lugs 15, which are so disposed as to engage or bear against the inner paneled wall surface 16' of the flanged can ends 16 and by the engagement therewith move the same upwardly over the upper surface of the inclined portion or extension 7' of the shelf or bracket 7, the line of travel of the said flanged can ends when engaged by the flights 16 of the endless carrier being in the line of direction indicated by the arrow a, Fig. 1 of the drawings.

A horizontally disposed drive shaft 17, Fig. 2 of the drawings, is journalled at 18, in the frame of the machine, and to this shaft rotary motion is imparted by means of the drive pulley 19, to which power is applied in any suitable manner. To the inner end of the said drive shaft 17, is secured a sprocket 20, over which travels a sprocket chain 21, for transmitting rotary motion from the drive shaft 17 to the feed shaft 9, the said sprocket chain working over a sprocket 22 secured to the said shaft. The motion thus transmitted from the drive shaft 17 to the feed shaft 9 imparts travel to the endless carrier 13, working within the groove or channel 14 for advancing the unlined can ends 16 over the inclined section or extension 7', of the shelf or bracket 7, during which movement of the said can ends, the same move between the guide rails 7², upwardly projecting from the upper surface of the said inclined section or extension 7', and the said unlined can ends advanced or moved upwardly by the endless carrier 13, are placed into axial alignment at the assembling station of the machine with one of the assembling devices advanced thereto, at which point or station the gasket liner is positioned onto the flange of the can end.

By reference to Figs. 1 and 2 of the drawings, it will be noted that a web 23 of gasket liner material, which is of sufficient width to embrace the outside diameter of the desired gasket liner to be severed therefrom, is wound in reel form upon a spool 25, freely mounted for rotation on one end of a fixed transversely disposed stud 26 supported by means of the the standards or brackets 27, a given distance above the frame of the machine. The free end of the web 23 is led to the feed rollers 28 and 29 situated at the discharge end portion of the machine, Fig. 1 of the drawings, which feed rollers are fixed respectively on shafts 30 and 31 and by means of which power driven rollers, the said web is unwound from the spool 25. During its line of travel through the machine from the roll 25 to the feed rollers 28 and 29, the web 23 passes over and beneath the cutting instrumentalities and beneath the assembling devices hereinafter described. The shaft 30 for the upper feed roller 28, is an idler shaft journalled at 32 to the wall 2 of the apparatus and in a bracket 33 secured to the shelf 7, while the lower shaft 31 for the feed roller 29, which is also journalled in the shelf 7, and the bracket 33, has rotation imparted thereto from the feed shaft 9, through a train of gears 34, 35 and 37, the gear 35 being loosely mounted on a fixed stud 36 and the gear 37 fixed to the feed shaft 9, Figs. 2, 3 and 4 of the drawings. By the proper timing of the said train of gears the feed rollers will be driven at such speed as to cause the unwinding of the web 23 and the drawing or feeding thereof through the machine at a proper rate of speed to cooperate with the travel of the can end 16, and with, as in the present case, the curvilinear travel of the cutting devices for partially severing the gasket liner and the assembling devices for removing the partially severed liners and depositing the same on the flange of the can end.

Mounted for rotation within the tubular bearing 4, Fig. 2 of the drawings, is a shaft 38, to one end of which is affixed the gear 39, which has rotation or rotary motion imparted thereto by means of the gear 40 secured to and carried by the drive shaft 17, Figs. 1 and 2 of the drawings. The outer end of the said shaft 38 terminates in an annular drum 41 which is provided with a circular flange 42, and the drum 41 carries peripherally a series of spaced cutting elements or punches each comprising a body portion 43 having formed on the outer face thereof the concentric dies or cutting ridges 44 and 45, Fig. 5 of the drawings, which dies are adapted to partially sever or cut from the traveling web 23, a gasket liner $23^a$ and an inner core piece or blank $23^b$, the said cutting or die elements being secured to and carried by a die ring 46, mounted on the periphery of the drum 41. The depending annular flange of the die ring 46 is adjustably secured to the flange 42 of the drum 41 by means of the machine screws 48, which pass through the slots 49 formed in the circular flange 47, of the die ring 46 and screw into the flange 42 of the drum 41. By means of the adjustability permitted the die ring 46 relative to the drum 41 due to the adjustable connection between the said parts, the position of the said die ring may be varied relative to the drum 41 so as to secure any desired setting of the cutting elements or dies relative to the web 23 which said web, as heretofore stated, partially surrounds or embraces the die ring 46. The cutting or die ridges 44 and 45 are interrupted at several points as designated by 43' on Fig. 5 of the drawings, so that at such points of the cutting ridges the web 23 is not severed by the gradual increasing pressure of the die or cutting ridges brought to bear thereon, with the result that the web leaves or is carried from within the sphere of a cutting or die element without being severed at such portions thereof, with the result that the partially severed gasket liner and core blank is maintained intact with the web at such points and in their partially severed condition the web is advanced to the assembling mechanism.

Laterally projecting from the frame wall 2 of the apparatus adjacent the cutting elements thereof is a ledge or supporting shelf 50, Figs. 1 and 2 of the drawings, the upper surface of which is slightly tapered or inclined downwardly toward the inner end thereof. This ledge or bracket supports a longitudinally disposed adjustable backing or die plate 51, which opposes said cutting elements and is adjustably mounted relative to the said shelf bracket or ledge 50 by means of the adjusting screw 52, the under surface of the said backing plate 51 being tapered or inclined upwardly from the inner to the outer end. By reason of the two tapered surfaces resting one against the other there is permitted the raising and lowering of the backing or die plate 51 relative to the cutting or die elements of the die ring 46, by an outward and inward adjustment being given to the said plate 51, the upper surface of the said plate 51 remaining at all times horizontal. Between the said plate 51 and the cutting instrumentalities or dies travels the web 23, the said backing or die plate 51 acting as a fixed surface to receive the pressure of the cutting dies or instrumentalities for partially severing of the gasket liner $23^a$ and core blank $23^b$ from the web during its travel through the apparatus. By reason of the longitudinally disposed upwardly projecting spaced guide walls 53, Figs. 1, 2 and 4 of the drawings, secured to the shelf, ledge or bracket 50, the backing or die plate 51 is maintained in proper alignment at all times and the said spaced guide walls 53 form a longitudinal guide channel for the web 23 as it passes beneath the cutting instrumentalities and over the said backing or die plate 51.

The construction of the assembling mechanism is similar to that of the cutting or die mechanism and it comprises a transversely disposed shaft 54, mounted for rotation within the bearing 5, Fig. 3 of the drawing. The said shaft 54 at one end carries a gear 55, which meshes with the gear 40 of the drive shaft 17 for receiving from the said shaft and transmitting to the shaft 54 rotation. The opposite end of the shaft 54 terminates in an annular drum 56, which is provided with a depending circular flange 57, similar to the flange 42, of the drum 41. The said drum 56 carries a plurality of circumferentially spaced assembling elements, each of which comprises a body portion 58 formed with an outwardly extending circular ridge 59, Fig. 6 of the drawings, the diameter of said ridge being approximately co-extensive with the diameter of the gasket liner to be removed from the web 23. These assembling elements are secured to and carried by a ring 60, mounted on the outer peripheral surface of the drum 56, the said ring 60 being provided or formed with a depending or circular flange 61, which is adjustably secured to the flange 57 of the drum 56 by means of the machine screws 62 passing through the slots 63 formed in the flange 61. By means of the adjustment thus permitted the ring 60 relative to the drum 56, the position of the assembling elements may be varied to properly position the same relative to the position of the cutting elements carried by the drum 41, and so positioned relative to the web 23 as to place the severing ridge or rib 59 in registry with the partially severed gasket liner $23^a$ of the web 23 as the same is brought into registry with the flange of an unlined can end 16 advanced by the endless carrier 13 in alignment therewith. As the can end is moved beneath and in registry with the assembling devices of the ring 60, and advanced in timed relation therewith, the ridge 59 of the assembling elements acts at such time as a punch to sever or break the unsevered portions of the gasket liner 23$^a$ and of the central core piece 23$^b$ of the web 23 and gradually to force the severed gasket liner onto the flange or seat 16$^a$ of the can end 16, the central core piece being held to the face of the body 58 of the assembling device. The depressed and shouldered central part of the can end, which receives the chuck in double seaming, holds back the core of the ring liner (Figs. 1 and 3) and the curled edge of the can end enters the gasket material on the line which is to be the outer margin of the ring liner or gasket and the inner margin of the remaining or exterior parts of the web while the ridge or assembling die element 59 presses the ring liner into the can end groove, thereby causing the slight connections between the ring liner and the core and web to be ruptured by a pulling action caused by said die element 59 in cooperation with the can end, so that the ring liner is entirely separated from the remaining parts of the web by the same action which seats it in the can end ready for double seaming. As the can end being lined is moved by the endless carrier 13 over the sprocket 11, it moves into contact with a deflecting plate 65, Fig. 1 of the drawings, and is deflected thereby through an opening 64 in the upper surface of the shelf or bracket 7 and onto the discharge plate 66, which plate is arranged at an incline and causes the discharge of the lined can end from the apparatus.

As the assembling instrumentality moves away from the surface of the shelf or bracket 7, owing to the rotation of the drum 56, the core blank or waste 23$^b$ adhering to the central body portion of the said element is removed or rejected therefrom, in the present case, by means of an air blast, the air jet being supplied from any suitable source of supply and conducted to the interior of the drum 56 by means of an air pipe 67, Figs. 1 and 3 of the drawings. This air pipe is provided at its open inner end with an ejector nozzle 68, which directs an air jet against the inner face of the drum 56. This drum is provided with a plurality of rotatably disposed outlet openings 69, each of which openings communicates and registers with an opening 70, formed in each of the assembling elements 58, Figs. 1 and 6 of the drawings. From this construction it is obvious that as the assembling elements 58 are successively brought into alignment with the nozzle 68 during the rotation of the drum 56, air under pressure will be admitted through the openings 69 and 70, the pressure of which acting against the inner surface of the waste or core blank 23$^b$ adhering to the face of the assembling device, will forcibly eject the same therefrom.

The operation of the apparatus may be briefly described as follows, reference being had more particularly to Fig. 1 of the drawings:—The can ends 16 to be lined are placed in any suitable manner on the upper surface of the inclined extension or section 7′ of the shelf or bracket 7 and during the course of movement of the endless traveling carrier 13 are engaged by the lug or flights 15 of said carrier which engage with the paneled wall 16′ of the said ends 16, and move the same in timed relation toward the sprocket 11, simultaneously with the can end feeding operation, the web 23 of the gasket liner material is continuously unwound from the reel 24 by the action of the feed rolls 28 and 29, it being understood that rotation is imparted to the drums 41 and 56 which operate in timed relation. As the web 23 is unwound from the reel 24, it partly embraces the rotating die ring 46, both the web and the ring at such time moving in timed relation and at a uniform speed of travel, the inner surface of the web 23 resting directly upon the cutting ridges 44 and 45 of certain of the die elements 43. As the die elements 43 with the web bearing thereon, approaches the position marked A in Fig. 1 of the drawings, the web is gradually forced by the rotating member 41 against the upper surface of the backing or die plate 51, and as the distances between the members gradually decrease the cutting ridges 44 and 45 are forced through the web of gasket liner material 23, partially cutting or severing therefrom a gasket liner 23$^a$ and an inner core or waste 23$^b$. However, at the relief points 43′ of the die ridges or ribs 44 and 45 of the cutting elements, portions 23′ of the web 23, see Fig. 4 of the drawings, remain uncut or unsevered. These uncut or unsevered portions of the said web 23, retain the gasket liner 23$^a$ and the inner core 23$^b$ within the web 23 as it passes over the backing plate 51 to the assembling position B of the assembling mechanism Fig. 1.

At the position B the partially severed gasket liner 23$^a$ and the partially severed waste or core piece 23$^b$ held united to the web 23, pass between the punch ridge 59 of the assembling element and the flange 16$^a$ of the can end 16, which at such time approaches axial alignment with said punch ridge 59 of the assembling element, and owing to the gradually increasing pressure of the said punch extension 59 onto the partially severed gasket liner 23$^a$ and core blank 23$^b$, the union therebetween and the web is ruptured and the liner gradually forced onto the flange of the can end 16 during the movement of the said flange with the movement of the rotary element 56. The waste or core section 23^b which is completely severed at such time from the web 23 being forced within the circumference of the punch ridge 59 and remains held therein until the assembling element 58 has advanced to the position C, at which point or position the air blast from the nozzle 68 impinges against the inner surface of the waste or core piece and forcibly ejects the same from off the assembling element. As the lined can end is advanced beyond the point B, it impinges against the deflector plate 65 and is guided or directed onto the inclined discharge plate 66, which leads the same to a suitable place of deposit.

It is usual practice in machines prior to the present invention, for the cutting of gasket liners from gasket material to either cut the same from a web of traveling liner material or from a disk blank of liner material, but, in either case, the gasket liner is first cut or severed and then transferred by an element which removes the same to an assembling position and into axial alignment with an unlined can end, and at which assembling station means are utilized to force the cut gasket liner from its carrying element onto the flange of the positioned can end. In such operated machines it is required that liner material of substantial thickness be employed in order to permit of the handling thereof successfully; whereas by the use of the present invention the gasket liner is not severed in its entirety from the liner material until brought by the body of said material to an assembling position, and at such position or station the final operation of severing the ring liner is completed and by the severing means deposited directly onto the flange of a can end positioned to receive the same. By these means liner material of comparative thinness may be utilized, inasmuch as there is no handling of the gasket liner after its severance from the liner material.

The invention has been described and illustrated in its preferred embodiment, but it is obvious to those skilled in the art that various changes may be made in the arrangement and details of the working parts without creating a departure from the nature and scope of the invention and I do not, therefore, wish to be understood as confining or limiting the invention to the details of construction and arrangement of the various working parts as herein shown and illustrated; but on the contrary wish to be understood as claiming the invention as broadly as the state of the art will permit.

Having thus described my invention what I claim as new and desire to protect by Letters Patent is:

1. An apparatus for the described purpose, the same comprising primary cutting instrumentalities for partially severing a ring liner and a central core piece from flat liner material, secondary punch instrumentalities for removing the partially cut liner and core piece from said liner material, mechanism for advancing the liner material successively to said instrumentalities, and means for advancing and positioning an unlined flanged can end into axial alignment with the second mentioned instrumentality to receive onto the flange thereof the ring liner removed thereby from the liner material.

2. An apparatus for the described purpose, the same comprising primary cutting means for partially severing a gasket liner and a central core piece from flat liner material, secondary punch means for removing the partially severed gasket liner and core piece from said liner material, mechanism for advancing the liner material successively to said mentioned cutting and punch means, and means for positioning an unlined flanged can end to receive onto the flange thereof the cut gasket liner.

3. An apparatus for the described purpose, the same comprising rotary means for partially severing a gasket liner and a core piece from a traveling web of flat liner material, secondary rotary means for removing the partially severed gasket liner and core piece from said traveling web, and means for positioning an unlined flanged can end to receive onto the flange thereof the gasket liner removed by the mentioned secondary means.

4. An apparatus for the described purpose provided with a cutting station and an assembling station, cutting instrumentalities situated at the cutting station for partially severing a gasket liner and a core piece from a traveling web of liner material, instrumentalities situated at the assembling station for removing the partially severed liner and core piece from said web, and means for positioning an unlined flanged can end at the assembling station to receive onto the flange thereof the removed liner.

5. An apparatus for the described purpose, the same comprising mechanism for advancing a web of liner material therethrough, primary means for partially severing a gasket liner and a core piece from said web, associated secondary means for removing the partially severed liner and core piece from said web, and means for advancing and positioning an unlined flanged can end to receive onto the flange thereof the gasket liner as removed by the mentioned secondary means.

6. An apparatus for the described purpose, the same comprising associated instrumentalities acting successively to partially sever from a traveling web of liner material a gasket liner and a core piece, and to remove from the web the partially severed gasket liner and core piece, and means for positioning an unlined flanged can end to receive onto the flange thereof the gasket liner as removed from the said web.

7. In an apparatus for the described purpose, the combination with mechanism for advancing therethrough a web of gasket liner material, of cutting means for simultaneously partially severing a gasket liner and a core piece from said web, of means spaced therefrom for removing the partially severed liner and core piece from the traveling web and means for positioning an unlined flanged can end to receive onto the flange thereof the removed gasket liner.

8. In an apparatus for the described purpose, the combination with cutting mechanism for partially severing a gasket liner from a traveling web of liner material, of mechanism operated in timed relation with said first mentioned mechanism for removing from the web the partially severed gasket liner, and means for advancing an unlined flanged can end into position to receive onto the flange thereof the gasket liner as removed from the said web.

9. An apparatus for the described purpose, the same comprising rotary means for partially severing a gasket liner and a core piece from a web of liner material, secondary rotary means spaced from the first mentioned rotary means for removing the partially severed gasket liner and core piece from said web, mechanism for advancing a web of liner material successively beneath said mentioned rotary means, and means for advancing an unlined flanged can end into position to receive onto the flange thereof the ring liner as removed from the web by the second mentioned rotary means.

10. In an apparatus for the described purpose, the same comprising a rotating instrumentality, a plurality of spaced cutting elements carried thereby each of which elements is provided with concentric interrupted cutting dies, a secondary rotating instrumentality separated from the first mentioned instrumentality and provided peripherally with a plurality of spaced assembling elements each of said elements being provided with a circular projecting punch extension for removing the partially severed liner and core piece from the web, means for advancing the web through the apparatus and successively beneath the said rotary instrumentalities and means for advancing an unlined flanged can end into position to receive the gasket liner removed from the web by the punches of the second mentioned rotary instrumentality.

11. In an apparatus for the described purpose, the combination with a plurality of spaced cutting elements adapted to partially sever a gasket liner from a traveling web of liner material, of means for imparting a curvilinear path of travel to said cutting element, a die plate with which said elements successively co-act, a plurality of spaced punches for successively removing the partially severed gasket liners from the web, means for imparting a curvilinear path of travel to said punches, mechanism for advancing a web of liner material through the apparatus and successively beneath the cutting and punch elements, and means for advancing an unlined flanged can end into position to receive onto the flange thereof a gasket liner removed from the traveling web.

12. In an apparatus for the described purpose, the combination with an element provided with an interrupted cutting die for partially severing a gasket liner from a web of liner material, of a die with which said element co-acts, an element provided with a punch for removing the partially severed gasket liner from the web of liner material, mechanism for advancing said web successively beneath the cutting die and the punch, and means for positioning an unlined flanged can end into position to receive on the flange thereof the gasket liner removed from the web by the said punch.

13. An apparatus for the described purpose, the same comprising mechanism for advancing a web of liner material therethrough from a cutting station to an assembling station, means at said cutting station adapted to partially sever the exterior of a gasket liner from said web by a discontinuous cut, means for advancing an unlined flanged can end into position at said assembling station to receive on the flange thereof a removed gasket liner, and means at said assembling station for removing the partially severed liner from the web and applying the same to the said can end.

14. An apparatus for the described purpose, the same comprising a rotary member provided with a plurality of spaced circumferentially disposed cutters for partially severing a ring liner from flat liner material, means for advancing flat liner material beneath the cutters of the said rotary member and to an assembling station, means for positioning a can end at an assembling station, and means for completely severing the ring liner from the gasket material and applying the same to the flange of a positioned can end.

15. In an apparatus for the described purpose, means for giving greater stability to the frail ring liner during carriage, consisting in devices for partially severing the said ring liner from the material at one station, automatic means co-actuated with said severing means for completing the severing at another station, and means for feeding the material from the first station to the other station, whereby the unsevered material acts as a reinforce for the liner, during carriage means for positioning a can end having an upstanding edge at said other station, said edge of the can end cooperating with said severing means to separate the liner from said material.

16. An apparatus for the described purpose, the same comprising a spool for a web of liner material, a rotary member carrying a plurality of cutting dies and over which said web moves during its travel through the apparatus, a die with which said cutting dies co-acts successively for the partial severing of gasket liners from the web, means for advancing the web through the apparatus, a second rotary member carrying a plurality of punches for successively removing the partially severed gasket liner from the web and means for successively positioning unlined flanged can ends beneath said punches to receive onto the flange thereof the removed gasket liners.

17. An apparatus for the described purpose, the same comprising two spaced rotary members carrying respectively a plurality of interrupted cutting dies and a plurality of removing plungers, an adjustable die plate member co-acting with the cutting dies of the first mentioned rotary member, means for advancing a web of liner material through the apparatus and successively beneath the said rotary members, and mechanism for actuating said members in timed relation whereby the cutting dies of the first member partially sever gasket liners from the web and the plungers of the second member removing the partially severed member therefrom.

18. An apparatus for the described purpose, the same comprising a rotary member provided with a plurality of interrupted cutting elements adjustably held thereto, a second rotary member provided with a plurality of spaced plungers adjustably held thereto, a supporting and die-opposing element associated with the cutting elements of the first mentioned rotary member, means for advancing a web of liner material successively beneath said rotary members, mechanism for imparting rotation to said members for causing the cutting elements of the first member to partially sever gasket liners from the traveling web and the plungers of the second member to remove from the web said partially severed liners, and means for advancing unlined flanged can ends into position to receive onto the flange thereof the removed gasket liners.

19. An apparatus for the described purpose, the same comprising a rotary member provided with a plurality of interrupted spaced cutting elements for partially severing a gasket liner and a core piece from a web of liner material, a second rotary member carrying a plurality of spaced plungers for removing the partially severed liners and core piece, depositing the gasket liner onto the flange of a can end and leaving the core piece adhering thereto, a die plate with which the cutting dies of the first rotary member co-acts, mechanism for advancing a web of liner material successively beneath said mentioned rotary elements, devices for positioning an unlined flanged can end to receive onto the flange thereof the removed gasket liner, and means for removing the core pieces from the second rotary elements after the deposit of the gasket liner onto the flange of the positioned can end.

20. An improvement in the art of cutting and applying gasket liners to flanged can ends, the same consisting in positioning flat liner material at a cutting station, then partly severing on its exterior periphery and leaving it partially attached thereto a ring liner from the said material, moving the liner material with its partly severed gasket from said station, and finally separating the partly severed gasket from the liner material and applying the same to the flange of a positioned can end.

21. An improvement in the art of cutting and applying gasket liners to flanged can ends, which consists in positioning flat liner material at a cutting station, partly severing on its exterior periphery and leaving it partially attached thereto a gasket liner from said material while so positioned, transferring the liner material with its partially severed gasket from said station, positioning a flanged can end to receive the gasket liner, forcibly separating the partly severed gasket from the liner material and applying the severed gasket to the flange of the positioned can end.

22. An improvement in the art of cutting gasket liners from a traveling web of liner material and applying the same to the flange of a can end, which consists in partly severing on its exterior periphery and leaving it partially attached thereto a gasket liner from the traveling web of the flat liner material and advancing the partly severed gasket to a severing station, thence forcibly separating the partly severed gasket from the liner material, and finally applying the severed gasket to the flange of an axially aligned can end.

23. An improvement in the art of cutting and applying gasket liners to flanged can ends, the same consisting in positioning flat liner material at a cutting station, then partly severing a ring liner and core-piece from said material and leaving the same attached thereto, thence advancing the liner material with its partly severed members from said station for positioning the partly severed members to an assembling station, and finally separating the partly severed members from the liner material and applying the severed gasket to the flange of a can end positioned at said station.

24. An improvement in the art of cutting and applying gasket liners from a strip or web of liner material to flanged can ends, which comprises the cutting of said material on exterior and interior lines so that the material between said lines forms an annular gasket liner, advancing said material and enclosed liner to a flanged can end at an assembling station, and then separating the gasket from the surrounding web or strip and applying it to the flange of said can end.

25. An improvement in the art of cutting and applying gasket liners from a strip or web of liner material to flanged can ends, which comprises the cutting of said material on exterior and interior lines so that the material between said lines forms an annular gasket liner and the material within the interior line forms a core, advancing said liner and enclosed gasket to a flanged can end at an assembling station, and then separating the gasket from the core and applying it to the flange of said can end.

26. An improvement in the art of cutting and applying gasket liners from a strip or web of liner material to flanged can ends, comprising cutting sheet gasket material on interior and exterior lines, the exterior line being the line of separation of the gasket from the waste of said material and the interior line being the line of separation of the core and gasket, conveying the core and gasket parts in their original relative positions, the core within the gasket, subsequently moving the core and gasket one with relation to the other and in a transverse direction, to free the gasket from the core and render it ready to be positioned on the flange of a flanged can end.

27. An apparatus for the described purpose, the same comprising means for making gasket liner-forming and core-forming cuts in a traveling web of material and leaving the gasket attached to the core, means for feeding said web carrying said liner to an assembling station, and combined therewith a pressing assembling device arranged to act on said ring liner while it is attached as described, for simultaneously separating said attachment of the liner and separating the liner from the core and depositing the liner over the shoulder and upon the flange of a can end to provide a lined can end, and means for placing a can end at the assembling station to receive the separated liner.

28. An apparatus for the described purpose, the same comprising liner forming and liner assembling mechanism such assembling mechanism comprising co-operating members, one supporting a can end and the other movable there against and in co-operation with the shoulder of the can end to sever the core from the liner and deposit the liner over the shoulder and on to the flange of the can end.

29. In an apparatus for the described purpose, means for giving greater stability to the frail ring liner during carriage, consisting in devices at a first station for partially severing the ring liner from the movable material of which it forms a part, automatic means at a second station co-operating with the edge of a positioned can end for completing the separation of the ring liner from the material, and means for feeding the material with the partly attached ring liner from the first station to the second station, means for separating the core from the ring liner and means for positioning said can end.

30. The combination of means at a first station for partly severing a gasket ring liner from a movable web of gasket material and also from the core, and subsequently acting means at a second station for pressing the gasket liner away from the exterior web and interior core and on to the flange of a can end, whereby the liner is entirely separated from the web and core, the combination also comprising means for feeding said material from the first station to the second station.

31. An apparatus for the described purpose, the same comprising continuously rotable liner-forming dies for operating on a traveling sheet of liner material and which leave the liners attached to said sheet, means for holding and guiding the liner material, continuously rotatable assembling elements timed in operation with said dies to detach the liners from said sheet and seat them on to the flanges of can ends, and a continuously movable carrier for can ends which presents the latter to said assembling elements.

32. The method of forming liners from a sheet of liner material and applying the same to a metallic can end having a laterally projecting flange, which consists in placing a web of liner material carrying a partially formed liner against the edge of the can end, pressing the web against the edge of the metal forming the flange of the can end at one or more points, and progressively shifting the pressure from said point or points along the edge of the metal for removing the liner from the web of material and depositing the same onto the flange of the can end.

33. The method of forming and applying ring liners to metal can ends, which consists in cutting a paper web to provide a partially formed liner partly integral with the web, placing the web with the ring liner thus partially formed, and still integral with the web, in registry with a flanged can end having its edge curled, and pressing the web against the edge of the metal forming the curl to remove the partially formed liner and apply the same bodily to the flange of the can end.

34. The method of forming and applying ring liners to metal can ends, which consists in cutting a strip to partially form a liner, advancing the web with its partially formed liner to a position in registry with the flanged can end having its edge curled, pressing the web against the edge of the metal forming the curl to remove the partially formed liner, and utilizing the said pressing means for seating the finished liner onto the flange of the can end.

35. The method of forming and applying ring liners to metal can ends which consists in placing a web of paper carrying a partially formed ring liner over the inner face of a flanged can end having its edge curled, pressing the web so as to force the outer boundary wall of the partially formed liner against the edge of the metal forming the curl of the can end at one or more points and progressively shifting the pressure from said point or points along the edge of the metal for severing the partially formed liner from the web and applying the same bodily to the flange of the can end.

36. The method of forming gasket liners from a web of liner material and lining flanged can ends having a curled edge, which consists in placing a flanged can end in position to receive the liner on its removal from the web of liner material, feeding a web of liner material beneath means for acting thereon to partially form a gasket liner therefrom, partially forming said gasket liner, advancing the web with its partially formed liner to an assembly station and positioning the partially formed liner in axial alignment with a positioned can end, and causing means to co-act with the curled edge of the can end for removing the partially formed liner from the web of liner material and depositing the same bodily onto the flange of the can end.

37. A machine for applying a liner to a flanged can end having a curled edge, comprising in combination means for supporting the can end with liner material in front thereof and holding a partially formed liner, and means for forcing the material against the edge of the metal of the can edge for removing the partially formed liner from the strip and bodily applying the same to the flange of the can end.

38. A machine for applying a ring liner to a flanged can end having a curled edge, comprising in combination means for supporting the can end with the liner material carrying a partially formed ring liner in front thereof, means for forcing the material against the edge of the metal of the can end for removal from the material of the partially formed ring liner and bodily depositing the same onto the flange of the can end, and means for removing the lined can end from the machine.

39. A machine for forming and removing a partially formed gasket liner from a web of liner material and applying the liner to a flanged can end having a curled edge, comprising in combination means for partially forming the ring liner relative to said material, means for advancing the material with its partially formed liner in front of the can end, and means for forcing the liner material against the edge of the metal of the can end for removing from the material a liner conforming to the contour of the can end, the said means being so constructed and disposed as to force the removed liner beneath the curled edge of the can end.

40. A machine for applying a gasket liner to a can end having a curled edge, the same comprising in combination means for partially forming a gasket liner relative to a web of liner material, means for supporting a can end with the liner material carrying the partially formed liner in front thereof, and rotating means for engaging the liner material and forcing the same against the edge of the metal of the can end for removing the partially formed liner and applying the same to the flange of the can end.

41. In a machine for applying a gasket liner to a flanged can end having a curled edge, comprising in combination with means for advancing a web of liner material carrying a partially formed gasket liner, of devices for supporting a can end with the liner material in front thereof, and rotary means co-acting with the curled edge of the can end for removing the partially formed liner from the liner material and depositing the liner onto the flange of the can end.

42. In a machine for removing partially formed gasket liners from a web of liner material and applying the same to the flange of a can end having a curled edge, comprising in combination means for positioning a flanged can end to receive the gasket liner, and rotary means co-acting with the curled edge of the can end for progressively removing the partially formed liner from the web of material and applying the same to the flange of the can end.

43. An apparatus for forming gasket liners and applying the same to flanged can ends having a curled edge, the same comprising means for advancing a web of liner material through the apparatus, co-acting means adapted to position the curled flanged can end beneath said web at an assembling station to receive onto the flange thereof a liner as removed from the web, primary means adapted to act relative to the web for partially forming a gasket liner, secondary means co-acting with the curled edge of the can end to completely remove from the web the partially formed liner carrier thereby and to apply the same to the flange of the can end, and means for actuating said mentioned parts in timed relation.

44. In a machine for forming and applying ring liners to can ends having curled edges, comprising in combination means for supporting the can ends with the lining material in front thereof, means for partially severing a gasket liner from said material at one station, conveying the partially severed gasket from said station by means of its attached portion to a second station, means for forcing the lining material against the metal of the can edge for completing the severing of the liner from said mentioned material, said forcing and severing means being so constructed and disposed as to force the severed ring liner beneath the curled edge of the can end.

45. In a machine for cutting and applying gasket liners to flanged can ends having a curled edge, the same comprising in combination separated primary and secondary operating stations, means situated at the secondary station for positioning thereto unlined flanged can ends, means for advancing a web of liner material in front of said stations, mechanism situated at the primary station adapted to act upon the web of liner material to provide a partially formed gasket liner relative said material, mechanism situated at the secondary station adapted to coact with the curled edge of a can end on the partially formed liner being situated in front thereof by an advance of the web from the primary to the secondary station and by a progressive pressure remove from the web the partially formed liner and apply the same to the flange of the can end.

46. In a machine for cutting and assembling gasket liners and can ends, the combination of mechanism for advancing gasket liner material and can ends to be lined to an assembling station, means in advance of said assembling station for partially severing a gasket liner from said liner material, and a severing member at said assembling station co-acting with the can end for completing the separation of the gasket from the said gasket material by the aid of the flange of the can end, the latter acting as a separating element, and applying said gasket to the said can end within the edge of the can end closure.

47. In a process for lining can ends, having liner-retaining flanges, with ring liners, the method of inserting said liner into its seat in the can end and partly under the flange thereof by the pressure of the opposing instrumentalities, one of which is the edge of the can end, which at the same time separate the liners from the sheets of liner material with which they are integral prior to such separation.

48. A method of forming and applying ring liners to metal can ends having an upstanding flange, which consists in causing liner material to be arranged at the face of the can end opposite to the edge of said flange, and then pressing said material against the edge of said flange and pressing said material at the inner side of said flange towards the groove of the can end, and thereby separating the liner from the material with which it was integral prior to such separation and applying it to the can end.

In testimony whereof I have signed my name to this specification in the presence of two subscribing witnesses.

AXEL JOHNSON.

Witnesses:
N. A. ACKER,
D. B. RICHARDS.